Jan. 24, 1950          H. W. GILBERT          2,495,249
MEANS FOR STOPPING MOVEMENT OF ELECTRICALLY
OPERATED CLOTH LAYING MACHINES
Filed March 4, 1947          2 Sheets-Sheet 1
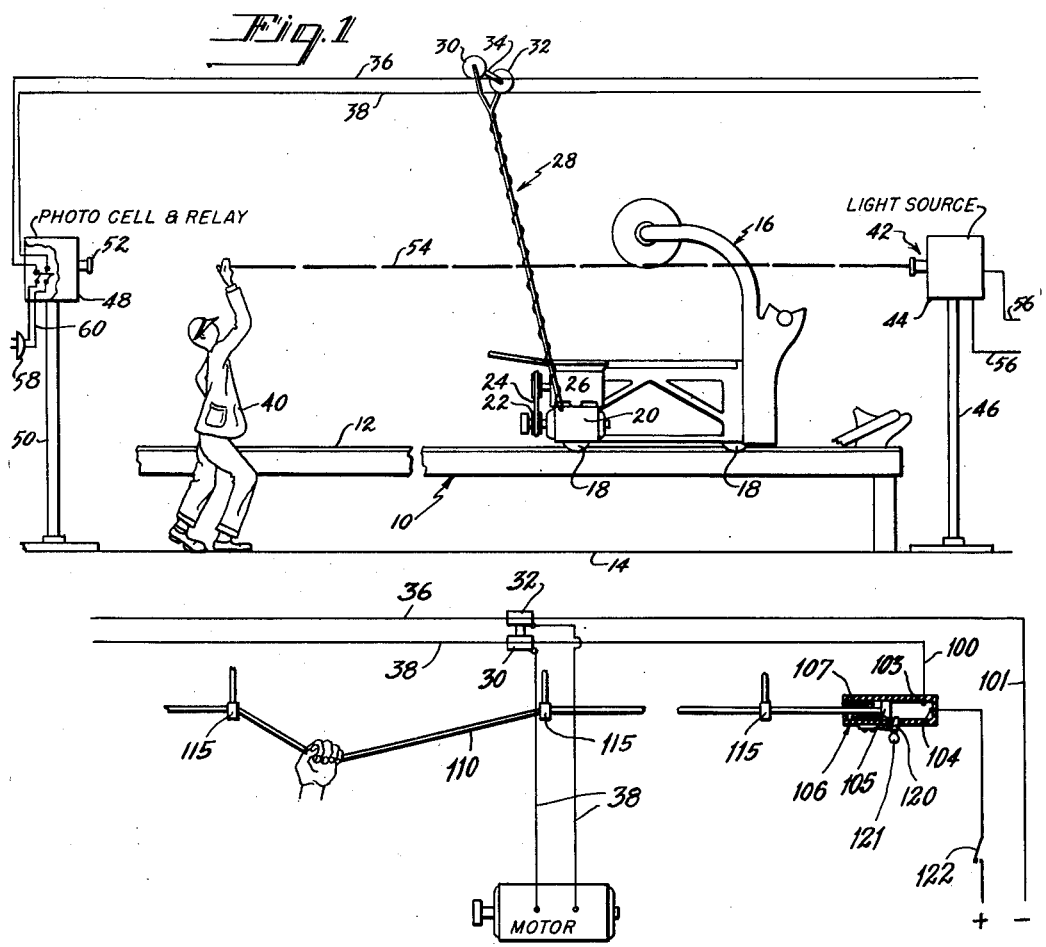
INVENTOR.
HERMAN WALTER GILBERT
BY
ATTORNEY Jan. 24, 1950     H. W. GILBERT     2,495,249
MEANS FOR STOPPING MOVEMENT OF ELECTRICALLY
OPERATED CLOTH LAYING MACHINES
Filed March 4, 1947     2 Sheets-Sheet 2
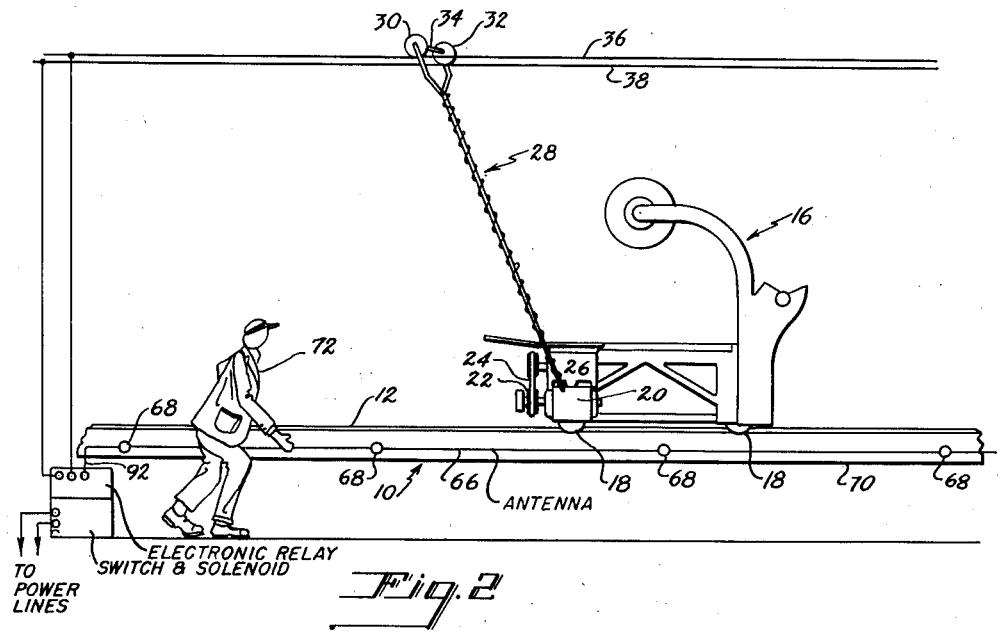
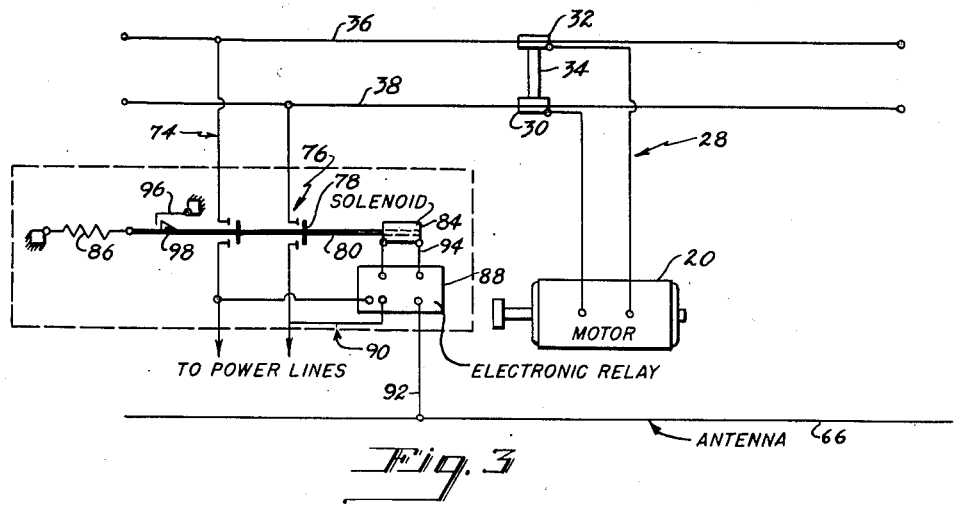
INVENTOR.
HERMAN WALTER GILBERT
BY
ATTORNEY

Patented Jan. 24, 1950

2,495,249

UNITED STATES PATENT OFFICE 2,495,249

MEANS FOR STOPPING MOVEMENT OF ELECTRICALLY OPERATED CLOTH LAYING MACHINES

Herman Walter Gilbert, New York, N. Y., assignor to Cutting Room Appliances Corporation, New York, N. Y., a corporation of New York Application March 4, 1947, Serial No. 732,158

7 Claims. (Cl. 270—31)

This invention relates to means for starting and stopping machines such as automatic cloth laying-up machines and the like.

An object of the invention is to provide a device whereby the motion of an automatic cloth laying-up machine may be controlled by the operator thereof without actual contact with the moving parts thereof.

Another object of the invention is to provide a switch device so arranged with respect to a cloth laying-up machine that the operator thereof may stop the travel of the moving parts thereof by interposing his hand in the path of light rays normally focussed upon a photoelectric cell.

A further object of the invention is to provide a switch device so arranged with respect to a cloth laying-up machine that the operator thereof may stop the travel of the moving parts thereof by touching the antenna of an electronic switch, the antenna being accessible to the operator at all points along the length of the cloth laying-up table.

Other objects and advantages of the invention will become apparent from the following description of a preferred embodiment thereof as illustrated in the accompanying drawings, and in which, Fig. 1 is an elevational view of a cloth laying-up table with a cloth laying spreader movable longitudinally thereon, and illustrating diagrammatically the light source and photoelectric cell device for stopping motion of the spreader;

Fig. 2 is an elevational view of a modified form of the invention, showing a cloth laying-up table with a cloth laying spreader movable longitudinally thereon, and illustrating the arrangement of the antenna on the side of the table with the operator touching the antenna to cut off current to and thereby stop the spreader;

Fig. 3 is a schematic and block diagram illustrating the connections of the parts for electronic control of the spreader as shown in Fig. 2; and Fig. 4 is a diagrammatic illustration of still another modified form of my invention for automatically stopping the movement of the carriage of a cloth laying-up machine at any point along its path of travel.

As is well known, cloth laying-up tables are generally very long, perhaps as long as three hundred feet from one end to the other, and, when an automatic electrically operated cloth laying spreader is continuously traversing the table longitudinally, back and forth, it has heretofore been quite difficult for a single operator to bring the spreader to a halt when necessary, due to sudden troubles which may develop. This is principally due to the extreme length of the tables, so that even if a switch is provided at some point along the table, the operator may not be anywhere near it when trouble occurs, and may have to run several hundred feet to reach the switch, with consequent lapse of time and continuation of the trouble and the damage caused thereby.

The present invention provides means whereby the operator, immediately upon sensing trouble, and regardless of where he is with relation to the length of the table, may then and there cut off the current, and bring the moving cloth laying spreader to a halt. In order to understand clearly the nature of the invention, and the best means for carrying it out, reference may now be had to the drawings, in which like numerals denote similar parts throughout the several views.

As shown, there is a standard type cloth laying-up table 10, the upper surface 12 of which is elevated above the floor 14, as seen in the views, and only a portion thereof being actually shown. A cloth laying spreader 16 is supported upon the table upon wheels 18 which may run directly upon the table top or more preferably upon longitudinal rails carried by the table.

The spreader 16 is propelled along the rails from one end of the table to the other and back again, by means of power derived from a motor 20 built into the spreader, the shaft of the motor being coupled through pulleys 22 and belts 24 to a speed reducing device such as a gear train disposed in a housing 26, the output of the gear train being engaged with the wheels 18 for rotating them in either direction so as to move the spreader to the left or to the right as desired. The motor 20 is driven by means of power derived through a pair of wires the upper ends of which are connected to conductive trolley pulleys 30 and 32. The pulleys are rotatable on a common non-conductive shaft 34, or, if desired, the shaft may be conductive and the pulleys insulated from the shaft.

The cloth spreader 16 may be of the type shown and operated as described in the copending application, Serial No. 760,388, filed July 11, 1947, by Herman Walter Gilbert and Walter Deichmann as joint inventors, for Automatically operated cloth laying machines.

Each trolley pulley rides upon one of a pair of trolley wires 36 and 38 which are supported under tension above the entire length of the table 10. As the spreader 16 traverses the table, the trolley pulleys ride along above the spreader and, being always in contact with the trolley wires, supply power for the spreader motor 20.

In order to permit stopping of the spreader by the operator 40 from any point along the length of the table 10, I provide a light source 42 supported in a housing 44 upon an upright post 46 at or near one end of the table 10, and provide a light receiving housing 48 supported on an upright post 50 at or near the other end of the table 10. A photoelectric cell 52 in the housing 48 is adapted to receive the light beam 54 originated by the light source in the housing 44 at the other end of the table. The housing 44 is provided with suitable reflectors and lens elements for focusing the light beam upon the photocell 52 continuously in the well known manner, power being derived for the housing 44 by means of wires 56 connected to the power lines or to any other suitable source of power.

The trolley wires 36 and 38 are connected to the power lines at 58 through wires 60, a double pole single throw switch inside the housing 48 being interposed in the lead wires 60 which extend through the housing. The photocell 52 is connected to a relay which is operative, so long as light from the beam 54 is received by the photocell, to maintain the double pole single throw switch closed, allowing current to flow from the power source through the wires 60 to the trolley wires and thence to the motor 20 for continuous movement of the cloth spreader 16.

The relay may thus operate to maintain the switch closed, overcoming the force of a spring which normally acts upon the switch to maintain it open. And when the light beam 54 is interrupted, as by having the operator 40 raise his hand and hold it in the path of the light beam as shown in Fig. 1, the relay is no longer supplied with power from the photocell to oppose the spring, and the spring acts upon the switch and opens it, cutting off the flow of current to the motor 20 and stopping motion of the spreader 16. It is apparent that the operator 40 may interrupt the light beam 54 at any position along the length of the table 10, by merely raising his hand as described into the path of the light beam.

A latch or detent may also be provided on the switch whereby it will be locked in open position once the light beam has been interrupted, to prevent further motion of the spreader until desired. To allow the spreader to be started up again after the trouble has been corrected, any suitable standard type of push button may be installed on the table and suitably connected by wires to a relay winding in the housing 48, for releasing the latch or detent which has locked the switch in open position, thus allowing the now uninterrupted light beam to again close the switch.

The specific details of the light source, photocell and photocell actuated relay, as well as the push button and its connections, have not been illustrated inasmuch as they are well known in the art and the details thereof do not form part of the invention.

Referring now to Figs. 2 and 3, it will be seen that there is shown diagrammatically a cloth laying-up table 10 with a cloth laying spreader 16 movable thereon longitudinally from left to right and back again as desired by the operator. Should it be necessary to stop the spreader for any reason during its travel, I have provided an alternative means for accomplishing this from any point along the entire length of the table at which the operator may be located when trouble making it desirable to stop the operation of the spreader develops.

For this purpose, I mount an antenna 66 upon insulators 68 secured to the longitudinal side rail 70 of the table 10 below the tracks 12, the antenna extending the full length of the table so as to be easily accessible to the operator 72 at any position he may occupy along the table when it is desired to stop the travel of the cloth laying spreader 16. Power for the motor 20 is conducted thereto from the power mains through wires 74 which are connected to the overhead trolley wires 36 and 38.

Trolley pulleys or conductive shoes 30 and 32 ride on the trolley wires and are connected by wires 28 to the motor 20, as shown in Figs. 2 and 3. A double pole switch 76 is interposed in the wires 74 so as to open and close the circuit as desired. The switch 76 may have stationary contact elements connected to the wires 74, and movable contact blades 78 carried by a rod 80, the right hand end of which forms a solenoid plunger extending into a solenoid coil 84, a spring 86 normally biasing the rod 80 in a leftward direction to close the switch 76, allowing current to flow from the power mains to the motor 20, and allowing the cloth laying spreader 16 to traverse the table longitudinally as already described.

An electronic relay device 88 is powered by current from the mains through wires 90, and incorporates an electronic circuit connected to the antenna 66 by means of wire 92. The electronic circuit, which may be any one of several well known in the art, has its power output connected by wires 94 to the solenoid 84, the antenna being connected to a tuned circuit in such a manner that the resultant flow of current through the solenoid is not great enough to overcome the pull of the spring 86, so that the switch 76 remains normally closed, with the motor 20 running. However, should the antenna 66 be touched by the hand of the operator 72, this will change the capacity of the tuned circuit forming part of the electronic relay 88, increasing the flow of current through the solenoid 84 sufficiently to overcome the spring 86, drawing the plunger 82 and the movable contact elements 78 to the right, and opening the switch 76, stopping the motor 20.

A detent 96 may be pivoted at one end and have its other end hooked as shown in Fig. 3, to engage a stud 98 on the rod 80 as it is drawn to the right by the solenoid, thus locking it in switch open position until the detent is released. In this manner, the operator 72 is able to bring the moving cloth laying spreader to a stop immediately whenever desired, regardless of his position along the length of the table 10, and this is done by merely touching the antenna 66 with his hand in the manner shown in Fig. 2. The trouble having been taken care of by the operator, he may then release the detent 96, allowing the switch 76 to close, and starting the motor 20 again. A relay may be provided for releasing the detent 96 from a distance, if desired. Some such switch holding or locking mechanism, including the parts 96 and 98, just described in connection with the Figs. 2 and 3 form of invention may also be employed for the Fig. 1 form of invention previously described.

In Fig. 4 I have shown still another form of my invention for stopping the cloth spreader at any desired point of its travel. In this form, lead lines 100, 102 and 101 connect the power lines 36 and 38 to a source of power. The lead lines 100 and 102 leading to the source of power is interrupted at the points 103 and 104. Normally an electrically conductive member 105, slidably operating in a cylinder 106 interconnects the points 103 and 104. A spring 107 in the cylinder 106 normally maintains the member 105 in contact with the points 103 and 104 to keep the spreader 16 continuously operating. When it is desired, for any reason, to stop the operation of the spreader, there has been provided a pull cord 110 connected to the member 105 and suitably supported from the ceiling by the brackets 115, running substantially coextensive with the length of the table. In Fig. 4, the hand of the operator so shown as pulling the cord 110 against the action of the spring 106 to break the circuit from the power source to the cables 36 and 38. A holding device 120 may be provided for holding the circuit open to prevent the operation of the spreader 16 until it is desired to resume operation. This may be done by simply grasping the handle 121 of the resilient device 120 and pulling the same clear of the member 105 so that the spring 106 can again interconnect the points 103 and 104. A switch 122 may be provided to render the device ineffective and to discontinue the operation of the spreader.

Although I have described my invention in specific terms, it is to be understood that various changes may be made in size, shape, materials and arrangement without departing from the spirit and scope of the invention as claimed.

Having thus described my invention, what I claim and desire to secure by Letters Patent is:

1. A device for use with a cloth laying-up table having a cloth laying spreader automatically traversing the table longitudinally thereof, comprising switch means interposed in the circuit leading to the spreader motor for opening the circuit and interrupting the current so as to bring the spreader to a halt, and means accessible to the operator for actuating said switch means.

2. A device for use with a cloth laying-up table having a cloth laying spreader automatically traversing the table longitudinally thereof, comprising switch means interposed in the circuit leading to the spreader motor for opening the circuit and interrupting the current so as to bring the spreader to a halt, and electromagnetic means accessible to the operator from any point along the length of the table for actuating said switch means.

3. A device for use with a cloth laying-up table having a cloth laying spreader automatically traversing the table longitudinally thereof, comprising normally closed switch means interposed in the spreader motor circuit for interrupting the current so as to bring the spreader to a halt, electromagnetic means for actuating said switch means to open the same, and photoelectric means accessible to the operator along the entire length of the table for actuating said electromagnetic means.

4. A device for use with a cloth laying-up table having a cloth laying spreader automatically traversing the table longitudinally thereof, comprising switch means resiliently biased toward open position and interposed in the spreader motor circuit for interrupting the current to bring the spreader to a halt, electromagnetic means operable to overcome said resilient bias to hold said switch means in closed position for maintaining said cloth laying spreader in motion, photocell means at one end of said table for supplying current to operate said electromagnetic means, light source means at the other end of said table and arranged to direct a beam of light longitudinally over the length of the table for actuating said photocell means, whereby upon interruption of said light beam by an operator located at any point along said table, said electromagnetic means is deenergized, allowing said resiliently biased switch means to open, stopping the motion of said cloth laying spreader.

5. A device for use with a cloth laying-up table having a cloth laying spreader automatically traversing the table longitudinally thereof, comprising switch means resiliently biased toward closed position and interposed in the spreader motor circuit, electromagnetic means operable to overcome said resilient bias to hold said switch means in open position for interrupting the current to bring the spreader to a halt when desired, and electronic means for actuating said electromagnetic means.

6. A device for use with a cloth laying-up table having a cloth laying spreader automatically traversing the table longitudinally thereof, comprising switch means resiliently biased toward closed position and interposed in the spreader motor circuit, electromagnetic means operable to overcome said resilient bias to hold said switch means in open position for interrupting the current to bring the spreader to a halt when desired, electronic means for actuating said electromagnetic means, and antenna means connected to said electronic means and accessible to an operator along the entire length of the table for being operated upon a touch thereof by the operator to influence the electronic means to actuate the electromagnetic means.

7. The construction according to claim 6, characterized further in that said electronic means includes an electronic circuit for furnishing current to said electromagnetic means, said circuit being so tuned in conjunction with said antenna that it normally does not furnish sufficient current to actuate said electromagnetic means, and whereby upon a change in antenna capacity induced by contact therewith of the operator's body said circuit will then operate to furnish an increased amount of current sufficient to actuate said electromagnetic means, whereby the said switch means is moved to open position, stopping the motion of said cloth laying spreader, and releasable detent means for locking said switch in open position.

HERMAN WALTER GILBERT.

REFERENCES CITED

The following references are of record in the file of this patent:

UNITED STATES PATENTS

| Number | Name | Date |
| --- | --- | --- |
| 528,547 | Marshall | Nov. 6, 1894 |
| 1,701,975 | Gunn | Feb. 12, 1929 |
| 1,978,589 | McFarlane | Oct. 30, 1934 |